Figure 1:
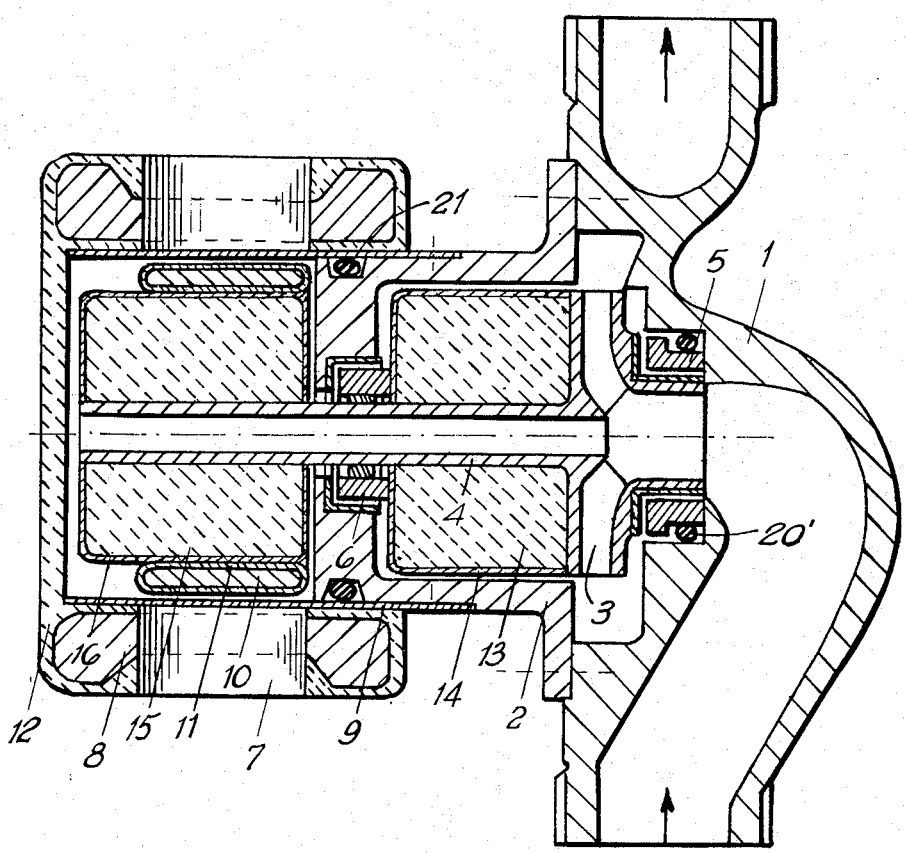

Dec. 17, 1963     H. MOSER     3,114,323
PUMP WITH LIGHTWEIGHT ROTOR RUNNING IN LIQUID
Filed Feb. 17, 1961     2 Sheets-Sheet 1

INVENTOR:
HANS MOSER
By Richardson, David and Nordon
ATTYS.

United States Patent Office 3,114,323
Patented Dec. 17, 1963

3,114,323
PUMP WITH LIGHTWEIGHT ROTOR RUNNING IN LIQUID
Hans Moser, 5 In der Hub, Zurich, Switzerland
Filed Feb. 17, 1961, Ser. No. 89,950
Claims priority, application Switzerland Feb. 23, 1960
2 Claims. (Cl. 103—87)

There are known electrical motors whose rotors run in liquids, for instance under-water motors, pumps, and circulators. The rotor of the motor and the impeller of the pump are built glandlessly as a unit together. The revolving unit is surrounded and lubricated by liquids, for instance the liquid which is pumped. When impure liquids of low viscosity and poor lubricating properties are pumped, the bearings will not long withstand the different forces acting on the bearings and will therefore soon wear out. The electromagnetic forces as well as the hydraulic forces (mostly axial forces) on the bearings can be compensated to a large extent. There thus remains as the only strong force acting on the bearings the weight of the rotor. If the pump is mounted with its axis vertical there is an axial force on the axial thrust bearing. If the pump is mounted with its axis horizontal, horizontal forces are applied on the radial bearing. Strong pressure on the bearings may destroy the lubricating film of the liquid in the bearings. Since there is some eccentricity of the revolving shaft in the bearing high friction and heavy wear are produced by the grinding effect of impurities entering the gap between shaft and bearing. The grinding effect is somewhat proportional to the eccentricity between the axis of shaft and bearing. On the start of the rotor before there is any film of liquid between shaft and bearing, there will be non-lubricated contact, or so-called dry friction, and the friction torque is especially heavy. Under these conditions the torque of the motor must be especially strong to overcome the friction torque and acceleration torque of the revolving masses. The usual single phase motors of small glandless pumping units have generally a small starting torque and they must be over-dimensioned. Their size must be bigger and thus they are more expensive than smaller motors providing sufficient power required under normal running conditions.

It is one object of the present invention to avoid these disadvantages by making rotor of the motor and the impeller very light in weight, by using light plastics and/or building in floating bodies consisting of foam or hollow spaces air- or gas-filled, the specific weight of which bodies is smaller than the surrounding liquid. In case these bodies are connected to the rotor or impeller, the vertical thrust upwards will be strongly increased and the forces on the bearings will decrease. Floating bodies, as air filled, liquid-tight spaces, built together with the rotor or the impeller, may increase slightly the total weight of the revolving unit. But the great volume increase of these floating bodies increases very much the total amount of displaced water or other liquid. As a result, there are minimized the quantities of required materials as iron and copper or aluminium for the electro-magnetic parts of the rotor and plastics for other parts of the rotor. All the materials used have much higher specific weight than the pumped water or other liquids such as oil. All these materials are used to construct floating bodies, whose specific weight is much smaller than that of water or oil. This structure results in a greatly reduced specific weight of the revolving body. The total force of the weight on the bearings can be calculated by multiplying the total volume of the revolving body by the difference of the specific weights of the body and of the displaced liquid. The mean value of specific weight of an ordinary rotor, consisting of iron (specific weight 7.7 gr./cm.³) and copper 8.9 gr./cm.³ or aluminium 2.7 gr./cm.³ windings will be roughly 8 or 7 gr./cm.³ according to the proportion of iron and copper or aluminium. The combination of such a rotor with a specific light-weight body, as foam or hollow spaces, built into the rotor will reduce the specific average weight to values of 5 gr./cm.³ or less. If the ideal value of 1 gr./cm.³ is achieved, the forces of the total weight of the revolving unit on the bearings under water will be zero, as the difference of specific weights is zero. By reducing the forces on the bearings to half of their original values, the starting torque will also be halved.

Two kinds of plastics may be used for the non electromagnetically active parts of the rotor for instance:

(1) Firstly, small elastic parts used to support rotor shafts, impeller etc., may be made of thermo-plastics or thermosetting plastics.

(2) Secondly, highly elastic plastic bodies (foam) which contain many volume increasing air or gas filled cells, may be used to increase the upwards thrust of the rotor when immersed in liquids.

Figure 2:
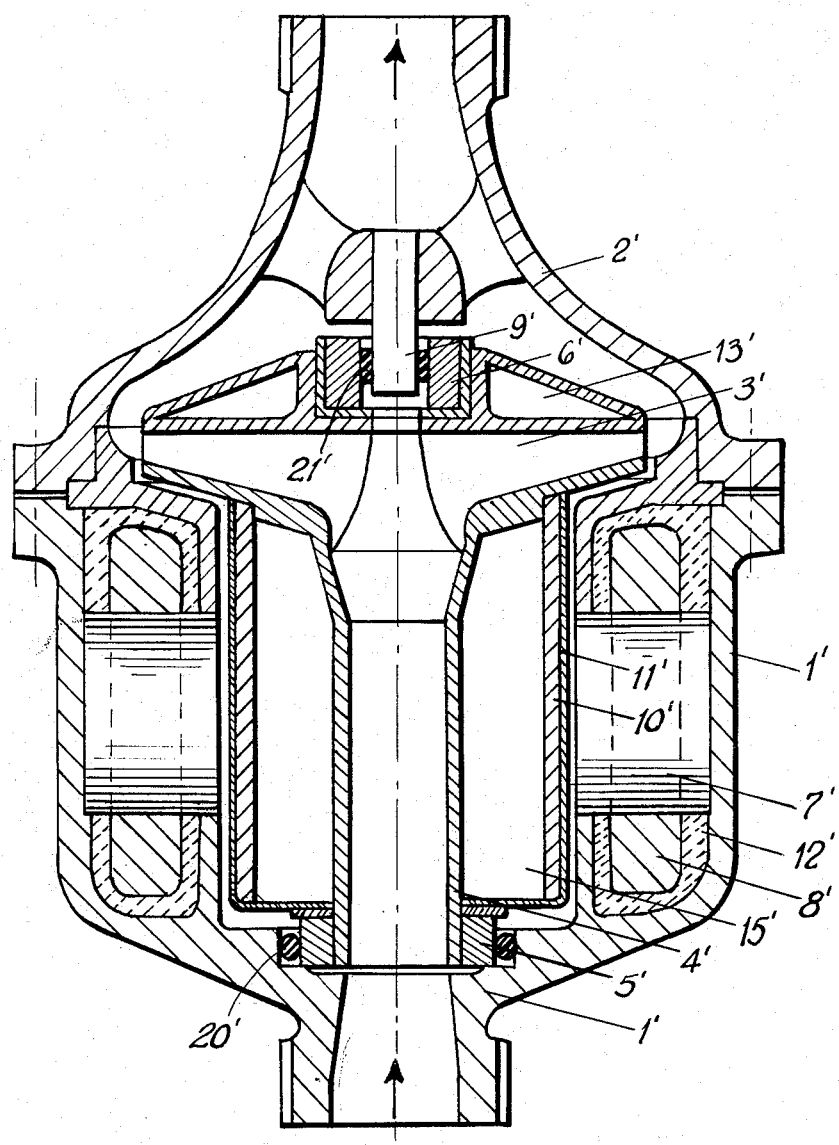

FIGS. 1 and 2 are central sectional views of two embodiments of the invention.

In FIG. 1 there is shown as one embodiment of the invention, a glandless circulator. Numeral 1 represents the housing where the pumped liquid will flow. Numeral 2 represents a cover which is connected with housing 1. An impeller 3 is built together as a unit with shaft 4 and is journaled on entrance bearing 5 and motor-side bearing 6 provided with sealing rings 20, 21. Numeral 7 represents laminations of a stator iron core with windings 8, and plastic resin mantle 12. A separation cylinder 9 is mounted together with stator 7 and resin 12 mantle. The cylinder is mounted tightly on said cover 2, by means of an elastic O-ring. Numeral 10 represents a magnetically active part of the rotor, for instance, a ring of iron laminations similar to those of the stator, or a ring of mild steel with or without slots on its outside surface. Numeral 11 represents an electrically conducting layer, i.e., copper, which partly or totally surrounds ring 10. The thickness of this coating must be such that the electrical currents in the rotor will be sufficiently strong to produce the torque. Numeral 13 represents a body lighter than the surrounding liquid, and might be filled with foam or gas or air. A surrounding end cover 14 of body 13 is made of rigid plastic, i.e. fibreglass or metal or other liquid resisting and liquid-tight material. The light weight body 15 for the rotor rings 10 and 11 consists of foam or of any other light material, if the high elasticity of foam is not desired. Numeral 16 represents an end cover. The elasticity of body 15 may be desired in case impurities are to be prevented from entering the gap between rotor 10, 11 and separation cylinder 9, by making the body elastic thus avoiding blocking of the rotor.

FIGURE 2 shows another embodiment of the invention. A liquid circulator is shown having a housing 1', cover and shield 2', impeller 3' and hollow revolving shaft 4'. A fixed bearing 5' is located at the circulator entrance and another fixed bearing 6' is located at the circulator exit. Numeral 7 represents laminations of the iron core having windings 8' and surrounding resin plastic body 12'. The fixed bearing 6 is self-aligning or adjustable by means of an elastic ring 20 which is mounted on a bolt 9 carried by cover 2'. The rotor has a magnetized body 10' with a torque producing copper mantle 11' surrounding body 10. The hollow air filled space 15' in body 10' is closed completely. Body 10 and mantle 11 might be respectively bodies of iron powder and copper fused together under pressure and heat. The space 15 may be filled with plastic foam.

In order to obtain an average specific weight of 1 g./cm.$^3$ of the revolving parts, the spaces 15 and 13 must be made quite large. A material as mild steel or other high-induction material is recommended for body 10' so that the body may have minimum radius.

In FIGURES 1 and 2 parts 10, 10' and 11, 11' of the rotors are smooth and unslotted. The rotors are of external slotless construction. The bodies 10, 10' are magnetically active and parts 11, 11' are electrically active.

It is possible to apply the invention to any other liquid running pump or motor, of any other design.

It is a part of the present invention, that glandless pumps of the types shown in FIGS. 1 and 2 be of light weight construction because of the relatively large diameters of the running surfaces of the journal bearings. It is known that pumps running on low viscosity liquids with impurities—as hot water in central heating systems—need for low "liquid friction": high running speed, lowest possible pressure on bearing surfaces, short axial length of radial journal bearings and maximum lubrication fluid pressure. The pumps of FIGS. 1 and 2 are constructed to meet these requirements. Since radial and axial clearances are connected hydraulically in series between the high pressure side and the low pressure side of the impeller, both thrust and journal bearings are lubricated by the maximum available hydraulic pressure of the pump. The clearance of the journal bearings is generally much smaller than the clearances of the thrust bearings. The larger part of the pressure drop occurs along the axial length of the journal bearings. This results in axial (hydraulic) thrust compensation for equal diameters of the inlet side and other side of the journal bearings. There is low pressure on the inner sides of the journal bearings and high pressure on the outside of the bearings. If for instance, the diameter of the inlet journal bearing 5 or 5' is larger than the diameter of the outlet or other side journal bearing 6 or 6', then a hydraulic thrust force will be produced from the rotor against the inlet thrust bearing 5 or 5'. This additional force, due to unequal diameters of the journal bearings, can be used to compensate for other axial forces due to weight of the rotor, or for other flow forces or electrical forces.

The disposition of the journal bearings at sealing rings 20, 20', 21, 21' serves to reduced the "short-circuit" water flow through the sealing rings. As the sealing rings in those types of pumps, as illustrated in FIGS. 1 and 2, are juxtaposed to the bearings 5 and 6, the short-circuited leakage flow of fluid through the very small clearances of the journal bearings is comparatively small. The leakage fluid through the bearings produces pressure lubrication, i.e., the leakage fluid is used for efficient lubrication. The small amount of leakage fluid, compared with the total flow of fluid, also results in high efficiency of the pump.

The relatively large diameters of the journal bearings, compared with those in other glandless pumps, means higher starting torque for the motor in order to overcome the higher friction torque of the (large diameter) journal bearings. If there are floating bodies connected to the rotor of the motor and to the impeller, to reduce the effect of the rotor weight by upwards thrust and to reduce the starting friction torque of the bearings, there is no disadvantage in using bearing having sufficiently large diameters to provide an axial inlet for liquid to the impeller, through the hollow inlet side of the pump.

What I claim is:

1. A pump for liquids, comprising a generally cylindrical casing having an inlet for liquid at one end, an electromagnetically driven rotor axially disposed in said casing and journaled in bearings at opposite ends thereof, said rotor having an outer wall hermetically sealing the same with a cavity therein extending substantially the full axial length of the rotor and extending substantially the full radial length thereof from its axis to the wall, so that the rotor has a specific gravity less than the specific gravity of the pumped liquid, said cavity being filled with plastic foam.

2. A pump for liquids according to claim 1, further comprising resilient rings concentric with and supporting said bearings in the casing, said rings permitting passage of liquid past the bearings and between said outer wall and casing so that the rotor floats in liquid while rotating therein and an impeller secured coaxially to said rotor and rotatable therewith, said casing having an outlet at its other end, said impeller being located at said outlet for driving liquid out of the casing through said outlet.

References Cited in the file of this patent

UNITED STATES PATENTS

| | | |
|---|---|---|
| 2,803,384 | Korte et al. | Aug. 20, 1957 |
| 2,844,101 | Burns et al. | July 22, 1958 |

FOREIGN PATENTS

| | | |
|---|---|---|
| 250,495 | Italy | May 17, 1926 |